Jan. 11, 1966     J. F. McHUGH     3,229,173
MICA CONDENSER WITH HARD-METAL TERMINAL FOILS AND
LEAD-TIN FOIL CONNECTIONS TO THE ELECTRODES
Original Filed Jan. 10, 1961
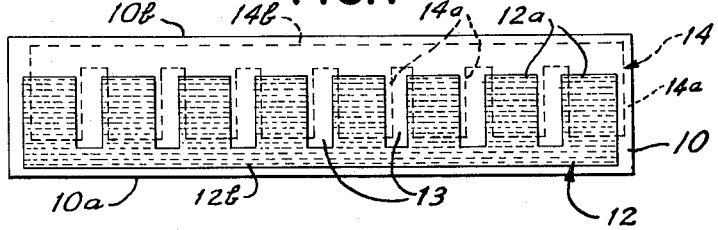
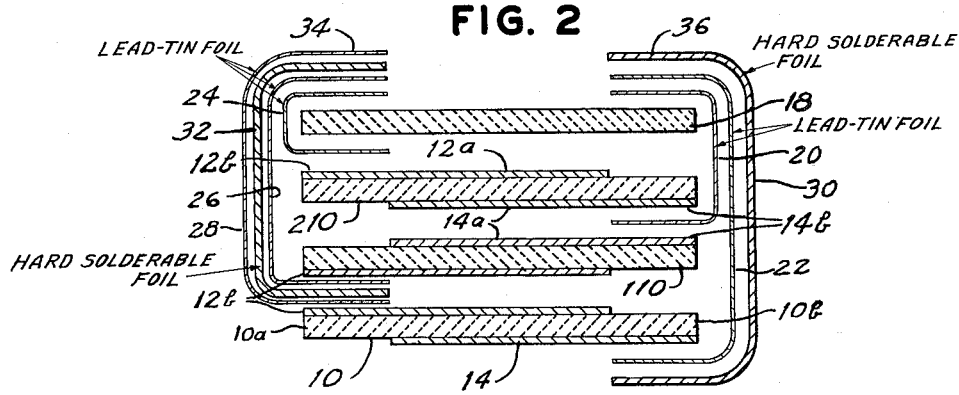
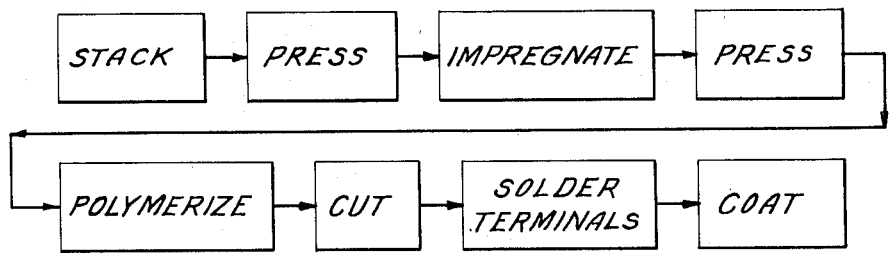
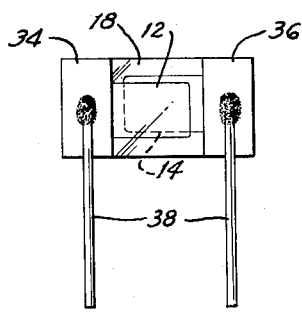
INVENTOR.
JAMES F. McHUGH
BY
ATTORNEY

United States Patent Office 3,229,173
Patented Jan. 11, 1966

3,229,173
MICA CONDENSER WITH HARD-METAL TERMINAL FOILS AND LEAD-TIN FOIL CONNECTIONS TO THE ELECTRODES
James F. McHugh, Cranston, R.I., assignor to Cornell-Dubilier Electric Corporation, a corporation of Delaware
Original application Jan. 10, 1961, Ser. No. 81,891, now Patent No. 3,151,382, dated Oct. 6, 1964. Divided and this application Feb. 6, 1964, Ser. No. 350,935
5 Claims. (Cl. 317—258)

This is a division of my copending application Serial No. 81,891 filed January 10, 1961, now Patent No. 3,151,382.

The present invention relates to mica condensers.

An object of this invention is to devise a novel and compact form of mica condenser construction. Another object resides in features of construction of small stacked-mica condensers that are more economical to produce and more compact for a given electrical size than comparable prior art types of mica condensers having metal end clips. A collateral object of the invention resides in the provision of a novel condenser construction wherein electrode-bearing micas can be stacked and processed as multiple-condenser units, which can then be cut apart into individual units to which wire terminals can be soldered.

The various features of the invention may be practiced pursuant to the illustrative embodiment described in detail below. In that embodiment, electrodes of fired silver paint are formed as films on the opposite faces of strips of mica. A number of these micas are stacked, and lead-tin alloy foil is interposed between edge portions of confronting electrode areas of the micas, alternately at one edge and at the opposite edge of the successive micas in the stack. In addition, a pair of foils of a relatively hard higher-melting-point metal are provided along the edges of the sacked mica strips, including one such additional foil that is folded around all of the mica elements and another that is folded around all but one of the micas and is interposed between that one mica and the remainder of the stack. The stacked mica strips with the lead-tin foils and the relatively hard foils are then baked, to dispel surface moisture, and subjected to heavy flattening pressure below the melting point of the lead-tin foils. This forms cold pressure welds between the lead-tin foils and the film electrodes and it also units the lead-tin foils and the hard-metal foils where they overlie one another. Cold pressure welding, commonly called cold welding, is the process of joining metals under conditions where no liquid phase is produced or introduced into the weld at any stage and without reliance on heat to produce fusion of the metals being joined. The pressed stack is impregnated, pressed again to expel excess impregnating liquid, and the impregnant is polymerized so that the stack of micas that is initially united mechanically by the cold welds becomes a bonded unit. The piece at this phase of the assembly is cut into tiny individual-condenser units to which wire terminals are secured by soldering. Subsequent application of a protective encapsulating coating completes each condenser.

The sequence of steps of cold-welding the film electrodes to the soft foils followed by impregnation and polymerization is of special importance. The initial step of cold-welding provides a series of electrical connections that are not impaired by the subsequent impregnation and provides a mechanical union between the micas, thus making impregnation of the stacked micas feasible. In turn, the impregnation and polymerization greatly facilitates and promotes successful cutting of the tiny stacked units, and it imparts important electrical properties to the finished unit.

The inclusion of foils of hard strong metal (in contrast to the lead foil that is sufficiently soft to form cold welds) is of considerable importance. If only lead-tin foils were used, it would be difficult to provide the condensers with soldered wire terminals. The foils would melt during soldering attempts, and are mechanically too weak to unite the terminal wires to the mica stacks. In an effort to avoid this, metal end clips might be used or conceivably the wires might be wrapped around the individual condenser stacked units. In either case the terminal structure becomes bulky, prominently bulky in the case of tiny units. The increase in bulk is due not only to the mass of metal that forms the terminal, but this bulk is considerably enlarged by the encapsulating coating subsequently applied. By contrast, the present terminal foils provide strong and solderable terminals without any appreciable increase in bulk of the stacked condenser unit beyond that involved in the micas and the connecting lead-tin foils.

The use of these hard terminal foils is also of importance in the manufacturing operation. These terminal foils are incorporated in the condenser units in the same operation as that which forms the stacked micas into a unit. Moreover this is done at a time when each mica stack represents a number of condenser units, the solderable metal foils being readily sheared in the same operation that cuts through the micas and the lead-tin foils. This procedure avoids handling of individual tiny metal terminals for assembly to individual stacked-mica condenser units, in a separate terminal-applying operation.

The nature of the invention, its various novel aspects and further objects will be more fully apparent from the following detailed description of an illustrative embodiment of the invention, which is shown in the accompanying drawings. In those drawings:

FIGURE 1 is an enlarged plan view of an individual mica having bonded metal-film electrodes;

FIGURE 2 is a greatly enlarged cross-section of stacked parts of a mica condenser, including three micas of the form in FIGURE 1;

FIGURE 3 is a flow diagram of the operations performed in the novel method of manufacturing a mica condenser of novel construction, and FIGURE 4 is an enlarged view of the novel condenser, as it appears just prior to the final encapsulation.

In FIGURE 1, a long and narrow strip 10 of mica is shown having a film 12 of fired-on silver paint on its top face and a like pattern of fired-on silver paint 14 on its opposite face. The metal films 12 and 14 include tongues 12a and 14a that confront each other in a series of areas there being eight such areas in this illustration. In practice the edges of tongues 12a and 14a are aligned, ideally, these tongues being shown off-set from each other for clearer illustration. Each film 12 and 14 has a marginal portion 12b and 14b which extends close to edges 10a and 10b, respectively. The lateral edges of the tongues are separated by gaps 13.

In an example, the micas may be only .001 or .002 inch thick, 0.25 inch wide and 1.25 inches long for micas having twelve (rather than eight) confronting tongues 12a and 14a.

In FIGURE 2 a series of these micas bearing metal films are shown stacked. For convenience, the bottom mica is designated 10, the next mica is designated 110 and the third is designated 210. A dummy mica 18 appears at the top, which does not have a film electrode.

A number of foils 20, 22, 24, 26 and 28 are shown for providing connection to areas 12b and 14b of micas 10, 110 and 210. In an example, these connecting foils are of 0.0006 inch lead-tin foil, and are relatively soft and malleable. A pair of terminal foils 30 and 32 are shown, these being of relatively hard, solderable metal. These terminal foils are of tinned copper approximately .001 inch thick in an example.

All of the foils are flat during the assembly operation, initially. The electrode-bearing micas, a dummy mica 18, and the foils are stacked with each foil extending between the edge portions of confronting micas alternating between opposite edges of the stack. The foils are then bent upright while the micas are moderately pressed together, and finally the foils are bent over the top of the stack of micas.

The edges of the micas are all in alignment in the stack, and the film electrodes are applied uniformly relative to the mica, and in this way assurance is had that the confronting areas 12a and 14a of the silver-film electrodes of successive micas overlie one another and that the spaces 13 between the confronting electrode areas are also in alignment in the stack.

The stacked strips of micas with their metal films and interposed foils folded as shown in FIGURE 2 are next baked to drive-off surface moisture on silver-film electrodes 12 and 14, at a temperature below the melting-point of the lead-in foil; and while thus heated, the stacks are subjected to intense pressure between flat opposed pressure members, as in a hydraulic press. This operation unites the stack as a mechanically tight unit. It is also effective to make excellent electrical connections from all the film electrodes to intense the terminal foils 30 and 32. The pressure is sufficient to form cold-welds between the metal films 12 and 14 and the respective opposed foils 20, 22, 24, 26 and 28; it cold-welds the terminal foils 30 and 32 to the confronting foils 22, 26 and 28 respectively at areas facing film electrodes 14 and 12 respectively; it cold-welds foils 24, 26, 28 and 32 at a terminal region 34; and it cold-welds foils 20, 22 and 30 at another terminal region 36. Considering this operation, it would be possible to use a hard-metal foil 32 with an initially bonded thickness of suitably ductile metal replacing foils 26 and 28; and likewise foils 22 and 30 might alternatively be bonded before being assembled. However, it has been found advantageous to assemble and cold-weld the film electrodes and the various foils as shown without requiring preparation of special copper foils. An example of such special foil would be .001 inch copper foil bearing lead-tin bonded layers of .0006 inch thickness, to substitute for the separate foils of the illustrative dimensions given above.

The stacking and pressing operations described are the first two steps diagrammatically illustrated in FIGURE 3. The unit thus produced is next impregnated with an insulating liquid, polyvinylformalacetyl resin for example, by usual vacuum-impregnation techniques. The stacked micas, bonded by the foils, can be handled in bulk during this operation.

During the impregnating operation, the impregnant not only fills the voids between the micas, but the impregnant also coats the entire mica stack including the areas where terminal wires are later to be soldered. The impregnant should be one selected to be compatible with this soldering operation if scraping is to be avoided preparatory to the subsequent soldering operation. Polyvinylformalacetyl resin is one example of an impregnant that satisfies this soldering condition, but others are known that meet this requirement.

The impregnated units are then spread on a flat surface and pressed, large numbers of these units being pressed concurrently for expelling surplus impregnant. Moderate heating then effects polymerization, preferably controlled at this time to effect incomplete polymerization so that the polymer remains somewhat plastic. These strips are subdivided into separate units, shearing them transversely at each of the spaces 13 (FIG. 1). While these individual units may be extremely small (one-quarter inch by one-eighth inch in an example) the laminations remain firmly adhered to each other and the various electrical connections described remain undisturbed. Due to the pressing operation that precedes the impregnation, the electrical connections previously described are also preserved.

In FIG. 2 the united foil portions 34 and 36 which overlie dummy mica 18 are normally covered by a film of the polymerized impregnant following the cutting operation. Nevertheless, wire leads 38 can readily be soldered to terminal portions 34 and 36 in the next operation without scraping the coating of impregnant from the soldering areas. Finally, a suitable encapsulating coating such as an epoxy resin is applied to complete the unit.

The completed condenser (omitting the encapsulating covering) is shown in FIGURE 4. In this greatly enlarged view, it is apparent that the edges of electrodes 12 and 14 are separated by a limited length of surface path around the lateral edges of each mica. The impregnation greatly enhances the voltage breakdown characteristics of this region; and the impregnation is carried out in a manner that does not disturb the vital electrical connections to the film electrodes. The stacked-mica impregnated units are seen to have mechanically and electrically strong terminals for soldering to wires 38, yet such terminals are included without any extra fabricating operation, without a separate operation of handling and mounting tiny metal end clips, and without any significant increase in bulk of the completed unit as compared to such a unit lacking solderable foil terminals.

The foregoing detailed description includes a number of novel features and represents the presently preferred embodiment of the various aspects of the invention. This description will naturally prompt those skilled in the art to make varied applications, substitutions and modifications of those novel features, and the invention should be broadly construed, in accordance with its full spirit and scope.

Having thus described my invention what I claim as new and desire to secure by Letters Patent is:

1. A mica condenser including a stack of rectangular micas having metal-film electrodes bonded to opposite faces thereof and having the edges of the electrodes spaced inward of three edges of each mica, respectively, lead-tin foils united to and extending from alternate fourth edge portions of respective opposed electrodes of successive micas in the stack and around a respective edge of the stack and each said lead-tin foil having a portion overlying an end portion of the stack, a pair of a metal that is relatively harder and of a relatively higher melting point than the lead-tin foils in the form of a channel at each edge of the stack from which said lead-tin foils extend and having a metallic bond thereto and overlying said end portions of the stack, and one of said terminal foils embracing all of said micas and the other embracing all but one of the micas, each of said terminal foils having a terminal wire soldered thereto.

2. A mica condenser in accordance with claim 1 wherein said stack of micas has a polymerized dielectric impregnant filling the voids thereof.

3. A mica condenser including a stack of micas having metal-film electrodes bonded to the opposite faces thereof, lead-tin foils united to confronting electrodes of successive micas in the stack, said foils extending about opposite edges of the stack from the spaces between alternate micas respectively and having portions overlying respective end portions of the stack, a pair of channel-shaped terminal foils of a metal relatively harder and of relatively higher melting point than the lead-tin foils along said opposite edges of the stack each of said terminal foils embracing a plurality of said micas and at least one of said terminal foils embracing all of said micas, the overlying portions of said lead-tin foils having a metallic bond to each other and to said terminal foils, and said lead-tin foils having a metallic bond to said terminal foils and to respective ones of said metal-film electrodes remote from said overlying portions.

4. A mica condenser in accordance with claim 3, having a polymerized dielectric impregnant filling the spaces within said stack and having wire terminals soldered to said overlying portions of said terminal foils.

5. A mica condenser in accordance with claim 3 including a wire terminal extending from each of said channel-shaped terminal foils and having fused-metal connections thereto.

References Cited by the Examiner

UNITED STATES PATENTS 3,118,095    1/1964    Baron _____ 317—261

FOREIGN PATENTS 550,419    1/1943    Great Britain.
582,651    11/1946    Great Britain.

JOHN F. BURNS, *Primary Examiner.*

DARRELL L. CLAY, *Examiner.*